(12) United States Patent
Van Hoecke et al.

(10) Patent No.: US 10,300,890 B2
(45) Date of Patent: May 28, 2019

(54) SYSTEMS AND METHODS FOR DETECTING AND MITIGATING UNAUTHORIZED VEHICLE LICENSE PLATE REMOVAL

(71) Applicant: Ford Global Technologies, LLC, Dearborn, MI (US)

(72) Inventors: Patrick Lawrence Jackson Van Hoecke, Dearborn, MI (US); Hamid M. Golgiri, Dearborn, MI (US); Danielle Rosenblatt, Dearborn, MI (US); Anthony Melatti, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 36 days.

(21) Appl. No.: 15/786,377

(22) Filed: Oct. 17, 2017

(65) Prior Publication Data
US 2019/0111893 A1  Apr. 18, 2019

(51) Int. Cl.
*B60R 25/30* (2013.01)
*B60R 25/10* (2013.01)
*H04N 7/18* (2006.01)
*H04N 5/247* (2006.01)
*B60R 25/34* (2013.01)

(52) U.S. Cl.
CPC ........ *B60R 25/305* (2013.01); *B60R 25/1001* (2013.01); *B60R 25/1007* (2013.01); *B60R 25/34* (2013.01); *H04N 5/247* (2013.01); *H04N 7/188* (2013.01); *B60R 2025/1016* (2013.01); *B60R 2325/205* (2013.01)

(58) Field of Classification Search
None
See application file for complete search history.

(56) References Cited

U.S. PATENT DOCUMENTS

| 4,713,506 A | 12/1987 | Klink |
| 2009/0128687 A1* | 5/2009 | Woo ........................ B60R 11/04 348/373 |
| 2013/0223955 A1* | 8/2013 | Hill ........................ B60R 13/105 411/374 |
| 2017/0057462 A1* | 3/2017 | Lykkja ................ G08B 21/0205 |
| 2017/0259759 A1* | 9/2017 | Hernandez de Luna .................... B60R 13/105 |
| 2018/0186331 A1* | 7/2018 | Dubal ..................... B60R 13/10 |

FOREIGN PATENT DOCUMENTS

| CN | 2832604 Y | 11/2006 |
| CN | 103963720 A | 8/2014 |
| CN | 206171354 U * | 5/2017 |

* cited by examiner

*Primary Examiner* — Heather R Jones
(74) *Attorney, Agent, or Firm* — Frank Lollo; James P. Muraff; Neal, Gerber & Eisenberg LLP

(57) ABSTRACT

Method and apparatus are disclosed for detecting and mitigating unauthorized vehicle license plate removal. An example vehicle includes a detection circuit having an insulator configured to slide along an axis based on a rotation of a screw holding a license plate, and a processor. The processor is configured to determine, based on a position of the insulator, that the screw has been removed while the vehicle is locked, and responsively activate a camera directed toward the license plate.

20 Claims, 5 Drawing Sheets

SYSTEMS AND METHODS FOR DETECTING AND MITIGATING UNAUTHORIZED VEHICLE LICENSE PLATE REMOVAL

TECHNICAL FIELD

The present disclosure generally relates to detection and prevention of vehicle license plate theft and, more specifically, systems and methods detecting and mitigating vehicle license plate removal.

BACKGROUND

Many vehicles include either or both of a rear license plate and a front license plate. Vehicles may also include security systems configured to prevent theft or damage to the vehicle through the use of alarms and other security measures designed to prevent the harm and/or draw attention to the vehicle to scare off the attacker. The alarms and security measures may be triggered or initiated by one or more vehicle sensors, such that an attack may be interrupted or stopped before damage has been done.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown describing systems, apparatuses, and methods for detecting and mitigating unauthorized vehicle license plate removal. An example disclosed vehicle includes a detection circuit having an insulator configured to slide along an axis based on a rotation of a screw holding a license plate, and a processor. The processor is configured to determine, based on a position of the insulator, that the screw has been removed while the vehicle is locked, and responsively activate a camera directed toward the license plate.

An example disclosed method includes monitoring a detection circuit of a vehicle having an insulator configured to slide along an axis based on a rotation of a screw holding a license plate. The method also includes determining, by a vehicle processor based on a position of the insulator, that the screw has been removed while the vehicle is locked. And the method further includes responsively activating a camera directed toward the license plate.

A third example may include means for monitoring a detection circuit of a vehicle having an insulator configured to slide along an axis based on a rotation of a screw holding a license plate. The third example may also include means for method determining, by a vehicle processor based on a position of the insulator, that the screw has been removed while the vehicle is locked. And the third example may further include means for responsively activating a camera directed toward the license plate.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
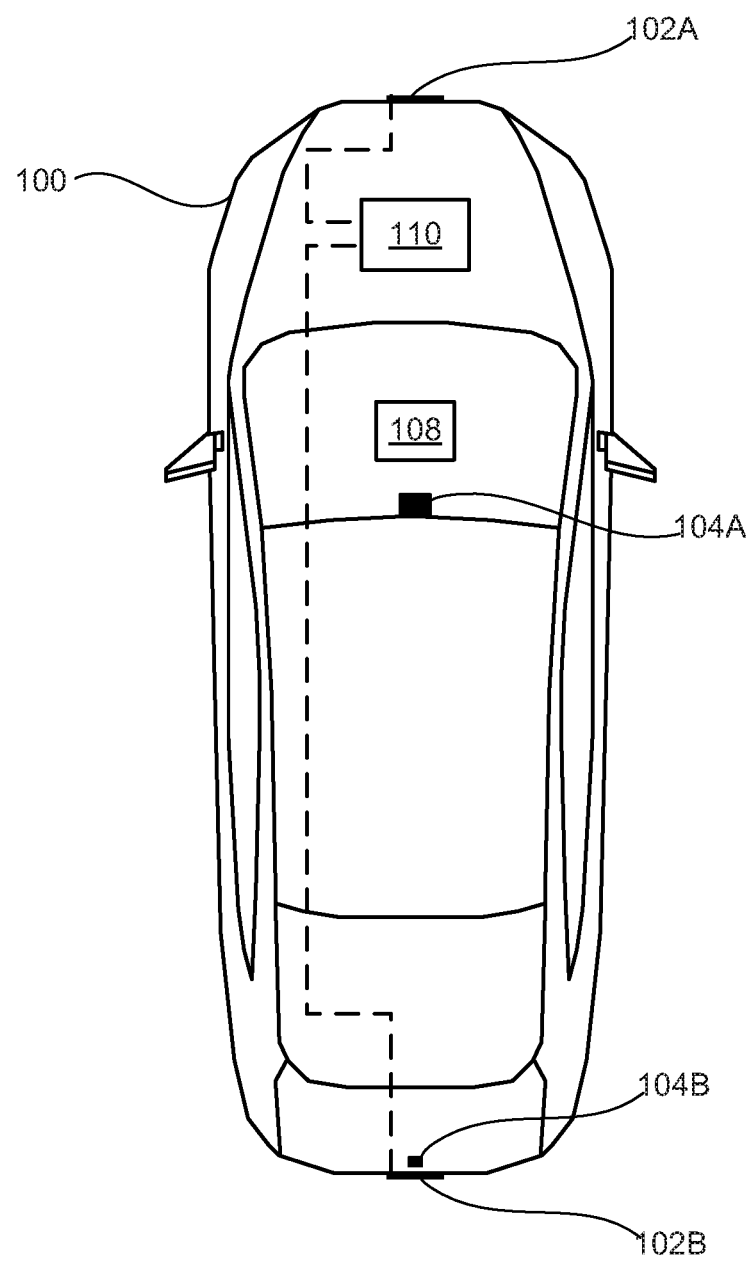
FIG. 1 illustrates an example vehicle according to embodiments of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above vehicles may include both front facing and rear facing license plates. Vehicle license plates are sometimes subject to theft, which can cause the owner of the vehicle to face fines or penalties. Further, the perpetrator of the theft may use the stolen license plate to commit a crime. As such methods and systems are needed for detecting when a license plate is in the process of being stolen or has already been stolen. Further, there is a need for more quickly determining that the license plate has been stolen and alerting the vehicle driver and/or authorities, so that proper action can be taken.

With these problems in mind, example embodiments of the present disclosure may include systems, devices, and mechanisms configured to detect when one or more screws holding the license plate to the vehicle have been removed. The vehicle cameras may then be activated in order to capture an image of the perpetrator, as well as turning on a vehicle alarm, and transmitting a message to one or more remote devices (e.g., the owner's cell phone, a central server, a government authority, etc.).

In order to carry out these actions, an example vehicle may include a detection circuit having an insulator configured to move or slide between two positions based on whether a screw holding the license plate to the vehicle is present or not. When the screw is present, the insulator is positioned in the circuit such that the circuit is open. When the screw is removed, the insulator slides to the second position, enabling a conductive segment to complete the circuit. This completed circuit then triggers one or more actions, such as the alarm to go off, the cameras to capture images, and one or more messages to be transmitted.

Embodiments disclosed with respect to FIGS. 1-5 herein may include descriptions of a circuit that is an open circuit when the screw is present, and a closed circuit when the screw is removed. This orientation may enable the circuit to draw power only when the screw is removed, thus conserving power under typical circumstances in which the license plate is still attached. However it should be noted that the opposite orientation may occur, such that there is a closed circuit when the screw is present, and an open circuit when the screw is removed.

Embodiments disclosed herein may enable the vehicle to detect that the license plate has been removed, and do so while drawing only a small amount of power from the battery. Further, embodiments disclosed herein may reduce a time between when a theft occurs and when the owner or an authority is notified. Further, the cameras may provide information about the perpetrator, which may be used by the authorities for identification purposes.

FIG. 1 illustrates and example vehicle 100 according to embodiments of the present disclosure. Vehicle 100 may be a standard gasoline powered vehicle, a hybrid vehicle, an electric vehicle, a fuel cell vehicle, or any other mobility implement type of vehicle. Vehicle 100 may be non-autonomous, semi-autonomous, or autonomous. Vehicle 100 may include parts related to mobility, such as a powertrain with an engine, a transmission, a suspension, a driveshaft, and/or wheels, etc. In the illustrated example, vehicle 100 may include one or more electronic components (described below with respect to FIG. 2).

As shown in FIG. 1, vehicle 100 may include one or more detection circuits 102, configured to determine when either the front or rear license plate has been removed. Vehicle 100 may also include a forward facing camera 104A, a rear facing camera 104B, and a processor 110. Vehicle 100 may include one or more additional electronic components, described in further detail with respect to FIG. 2.

Detection circuits 102A-B may be configured to detect when a screw has been removed from holding a license plate to the vehicle, which may indicate that the license plate is in the process of being removed from the vehicle. A license plate may be held in place by two or more screws, and as such the detection circuit may be configured to detect when one screw is removed, or when two or more screws are removed. In some examples the detection circuit may be able to determine that a first screw of a plurality of screws is removed, and to turn on an alarm or take one or more actions before a second screw is removed. This may assist in preventing theft of the license plate.

Alternatively, the detection circuit may be configured to detect when all screws are removed from the license plate. Some license plates may be held in place by fewer screws than are available based on the license plate design (e.g., where one or more screws is missing, though not due to an active theft). Allowing the detection circuit to determine only when all screws are removed may avoid false positives and unnecessary actions to be taken.

Further structural and functional characteristics of the detection circuit are described below with respect to FIGS. 3A-B and 4A-B.

Cameras 104A and 104B may be positioned at one or more locations around vehicle 100. For instance, camera 104A may be positioned on a rear view mirror, with a field of view facing forward of the vehicle. And camera 102B may be a rear facing camera positioned near the license plate, such as a backup camera. Other positions are possible as well.

Each camera may be configured to capture images of a respective field of view. For instance when a detection circuit 102B corresponding to the rear license plate determines that one or more screws have been removed, the rear camera 104B may be configured to capture an image of its field of view, which may include the perpetrator or person who removed the screw. Similarly, when the front detection circuit 102A determines that a front screw has been removed, the front camera 104A may capture an image, which may include the perpetrator in front of the vehicle. These images can be used later to identify the perpetrator.

Processor 110 may be electrically coupled to the detection circuits 102A and 102B, and may be configured to determine when one or more screws have been removed. This may be described in further detail with respect to FIGS. 3A-B and 4A-B.

When it is determined that one or more screws have been removed, processor 110 may be configured to activate one or more security measures. The security measures may include using a camera such as camera 104A or 104B to capture an image of the license plate, the perpetrator, and/or field of view directed toward the license plate corresponding to the removed screw. In some examples, the camera may be positioned near the license plate, such that it has a field of view projecting outward from, but not including, the license plate. The purpose of the camera may be to capture a field of view that includes a perpetrator or person acting on the license plate. Within this disclosure, when a camera is described as being directed toward the license plate, that should be understood to mean that the camera field of view is directed toward a person acting on the license plate, so as to catch a would be perpetrator in the act. The security measures may also include turning on the vehicle alarm, transmitting an alert or other message to a remote computing device (e.g., a phone of the vehicle owner, a government authority, a central server, etc.). In some examples, the processor 110 may provide a message or alert on a vehicle display when the vehicle is started. Other security measures may be taken as well.

Figure 2:
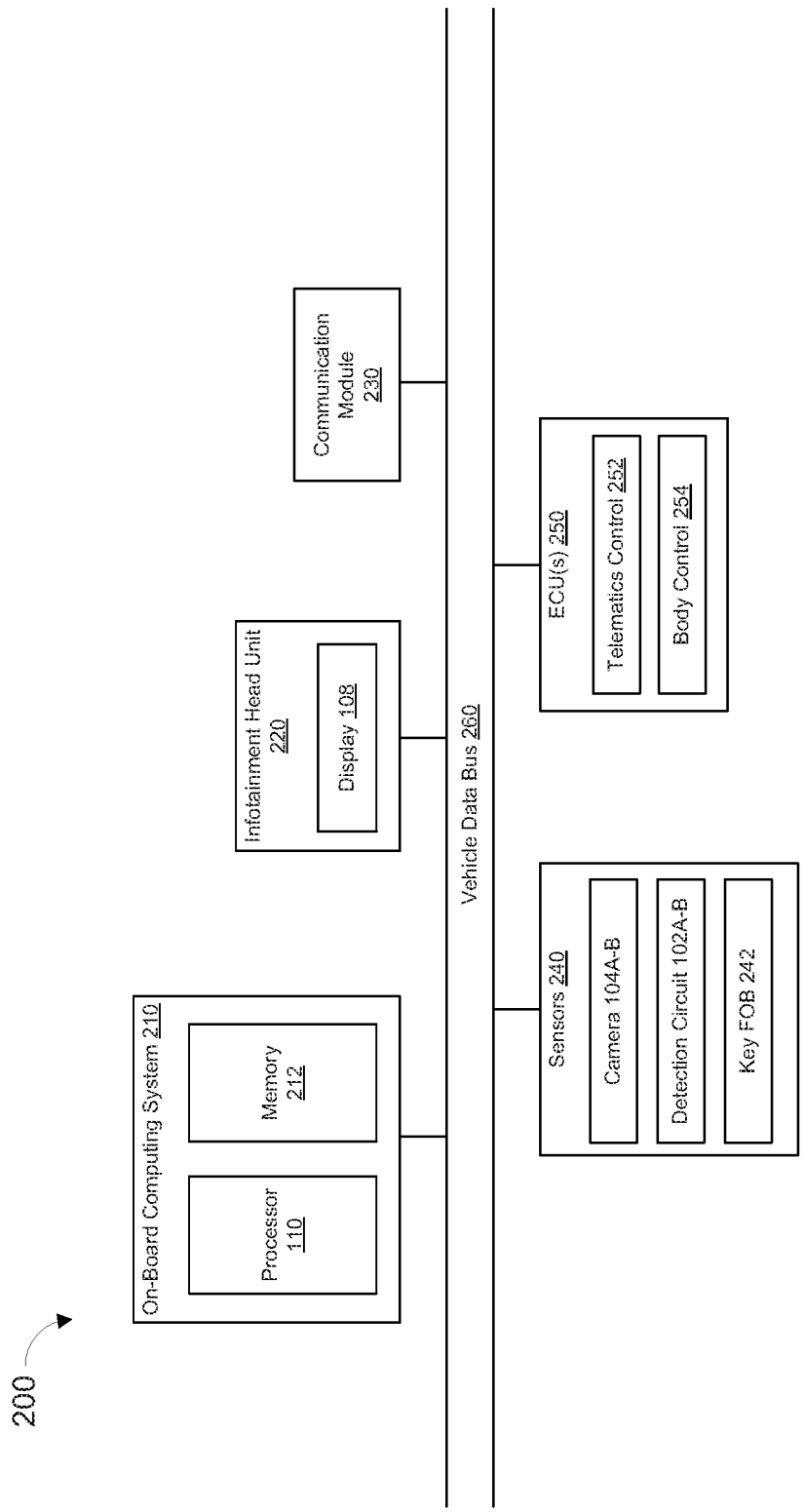
FIG. 2 illustrates an example block diagram of electronic components of the vehicle of FIG. 1.

FIG. 2 illustrates an example block diagram 200 showing electronic components of vehicle 100, according to some embodiments. In the illustrated example, the electronic components 200 include the on-board computing system 210, infotainment head unit 220, communication module 230, sensors 240, electronic control unit(s) 250, and vehicle data bus 260.

The on-board computing system 210 may include a microcontroller unit, controller or processor 110 and memory 212. Processor 110 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 212 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 212 includes multiple kinds of memory, particularly volatile memory and non-volatile memory.

The memory 212 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 212, the computer readable medium, and/or within the processor 110 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 220 may provide an interface between vehicle 100 and a user. The infotainment head unit 220 may include one or more input and/or output devices, such as display 108. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. In the illustrated example, the infotainment head unit 220 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). In some examples the infotainment head unit 220 may share a processor with on-board computing system 210. Additionally, the infotainment head unit 220 may display the infotainment system on, for example, a display 108 of vehicle 100.

Communication module 230 may be configured to transmit and receive data with one or more remote computing devices via one or more wireless communication standards. For instance, the communication module 230 may be configured to transmit and receive information with a mobile phone of an owner or driver of vehicle 100, a governmental authority (i.e., the police), or a centralized server corresponding to the vehicle manufacturer.

Sensors 240 may be arranged in and around the vehicle 100 in any suitable fashion. In the illustrated example, sensors 240 include cameras 104A-B, detections circuits 102A-B, and a key FOB sensor 242. The key FOB sensor 242 may include one or more antennas configured to communicate with a key FOB, phone as a key (PaaK), or other remote device configured to lock or unlock the vehicle. The key FOB sensor 242 may include BLUETOOTH, radar, or any number of other wireless communication technologies. One or more other sensors may also be included as well.

The ECUs 250 may monitor and control subsystems of vehicle 100. ECUs 250 may communicate and exchange information via vehicle data bus 260. Additionally, ECUs 250 may communicate properties (such as, status of the ECU 250, sensor readings, control state, error and diagnostic codes, etc.) to and/or receive requests from other ECUs 250. Some vehicles 100 may have seventy or more ECUs 250 located in various locations around the vehicle 100 communicatively coupled by vehicle data bus 260. ECUs 250 may be discrete sets of electronics that include their own circuit(s) (such as integrated circuits, microprocessors, memory, storage, etc.) and firmware, sensors, actuators, and/or mounting hardware. In the illustrated example, ECUs 250 may include the telematics control unit 252 and the body control unit 254.

The telematics control unit 252 may control tracking of the vehicle 100, for example, using data received by a GPS receiver, communication module 230, and/or one or more sensors. The body control unit 254 may control various subsystems of the vehicle 100. For example, the body control unit 254 may control power a trunk latch, windows, power locks, power moon roof control, an immobilizer system, and/or power mirrors, etc. Other ECUs are possible as well.

Vehicle data bus 260 may include one or more data buses that communicatively couple the on-board computing system 210, infotainment head unit 220, communication module 230, sensors 240, ECUs 250, and other devices or systems connected to the vehicle data bus 260. In some examples, vehicle data bus 260 may be implemented in accordance with the controller area network (CAN) bus protocol as defined by International Standards Organization (ISO) 11898-1. Alternatively, in some examples, vehicle data bus 260 may be a Media Oriented Systems Transport (MOST) bus, or a CAN flexible data (CAN-FD) bus (ISO 11898-7).

Figure 3B:
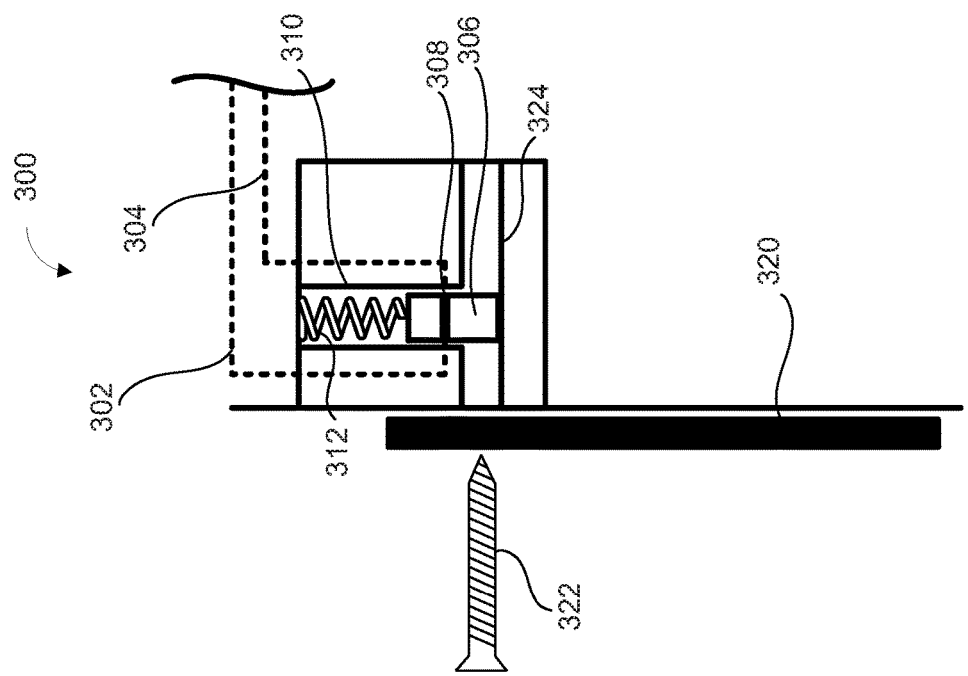
FIGS. 3A and 3B illustrate a side cross section of an example detection mechanism in a first state and a second state according to embodiments of the present disclosure.
Figure 3A:
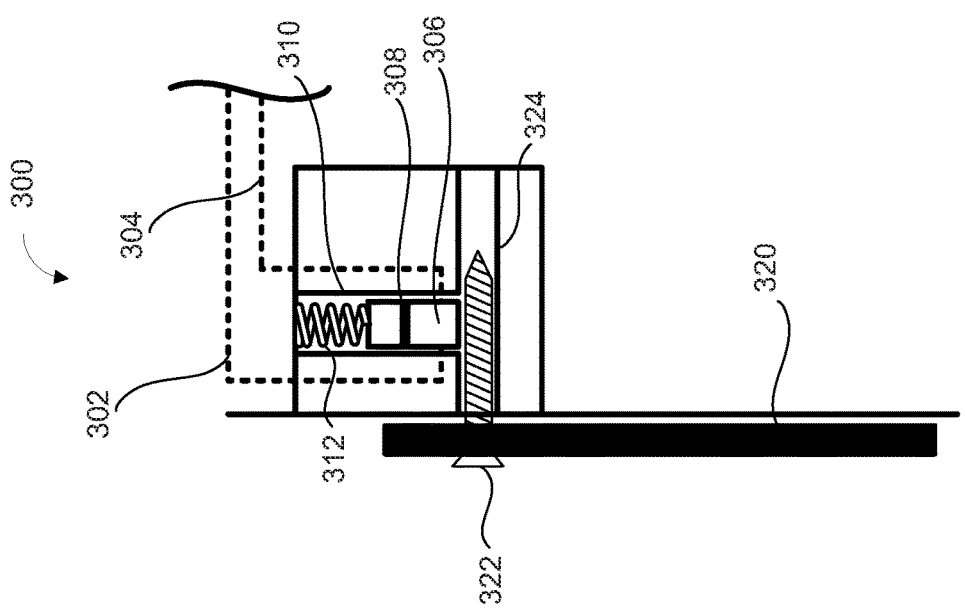

FIGS. 3A and 3B illustrate an example detection circuit 300 in respective first and second states. Detection circuit 300 may include two wires 302 and 304, which when coupled together complete the detection circuit. When the detection circuit is completed, it may be called a "closed circuit," which may enable the circuit in combination with a processor such as processor 110 to determine that the screw 322 has been removed.

As shown in FIGS. 3A and 3B, detection circuit 300 may include an insulator 306 having a conductive segment 308. When the insulator is in the first position shown in FIG. 3A, the circuit is "open," because wires 302 and 304 are disconnected from each other. The insulator 306 may be configured to slide along an axis within channel 310. In some examples, insulator 306 may slide based on a rotation of screw 322 within a second channel 324. The screw 322 may be configured to hold license plate 320 onto the vehicle. When the screw 322 is rotated into channel 324, insulator 306 is pushed up and out of channel 324. This is shown in FIG. 3A, wherein the screw 322 is fully rotated into the channel 324. But when screw 322 is rotated out of channel 324 or removed from channel 324 (shown in FIG. 3B), insulator 306 may slide along the axis corresponding to channel 310, moving into the second position shown in FIG. 3B.

In FIGS. 3A and 3B, movement of the screw 322 corresponds to a movement of the insulator 306 at less than a 1:1 ratio. For instance, although the Figures are not to scale, it should be noted that the screw 322 may move a greater distance than the insulator 306. As such, the distance that the insulator moves between the first position and the second position may be smaller than the that the screw moves when it is fully rotated into channel 324 and when it is removed from channel 324. Other ratios are possible as well.

In the second position, the conductive segment 308 of insulator 306 may be positioned such that wires 302 and 304 are now coupled together. This may complete the circuit, causing the circuit to be closed.

In some examples, detection circuit 300 may also include a spring 312 configured to bias the insulator toward a position along an axis. For instance, spring 312 shown in FIGS. 3A and 3B may be configured to bias insulator 306 toward the second position along the axis corresponding to channel 310 shown in FIG. 3B. As such, when the screw 322 is removed from channel 324, spring 312 may push insulator 306 down into channel 324, allowing the conductive segment 308 to complete the circuit. In other examples, a different mechanism other than a spring may be used to bias insulator 306 toward one or more positions.

Detection circuit 300 is shown such that it is an open circuit when insulator 306 is in the first position (FIG. 3A) and is a closed circuit when insulator 306 is in the second position (3B). However it should be noted that other orientations and arrangements are possible as well. Detection circuit may be configured such that the insulator 306 can move between an "open" position and a "closed" position based on whether screw 322 is present or not. As such, some examples may include the detection circuit as an open circuit when screw 322 is removed, and a closed circuit when screw 322 is present or fully rotated into channel 324.

As shown in FIGS. 3A and 3B, rotation of screw 322 into and out of channel 324 may cause corresponding movement of insulator 306 within channel 310. Channel 324 may be perpendicular to channel 310, such that movement of screw 322 into and out of channel 324 causes perpendicular movement of insulator 306 within channel 310. In other words, insulator 306 may be configured to slide along a first axis, and rotation of the screw 322 may be configured to move the screw 322 along a second axis, wherein the first axis is perpendicular to the second axis.

Figure 4A:
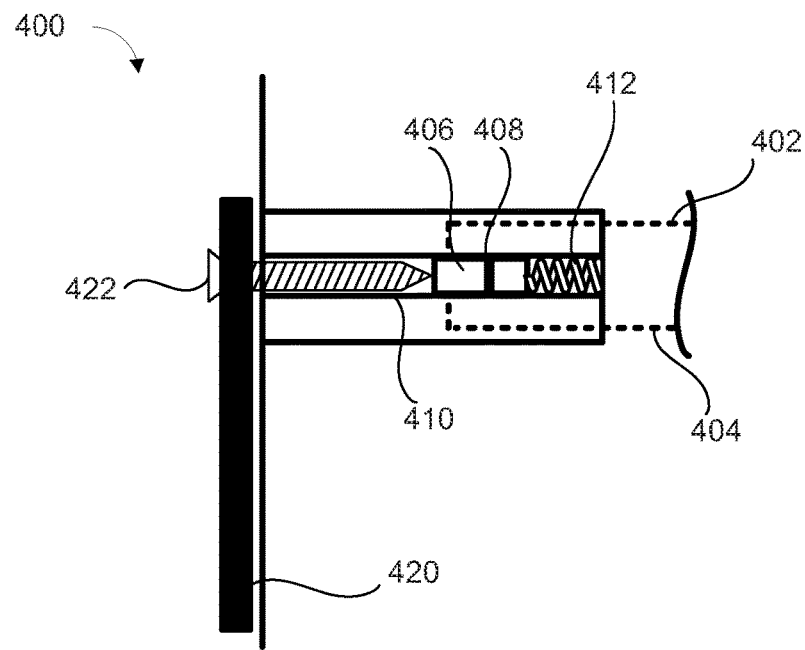
FIGS. 4A and 4B illustrate a side cross section of a second example detection mechanism in a first state and a second state according to embodiments of the present disclosure.
Figure 4B:
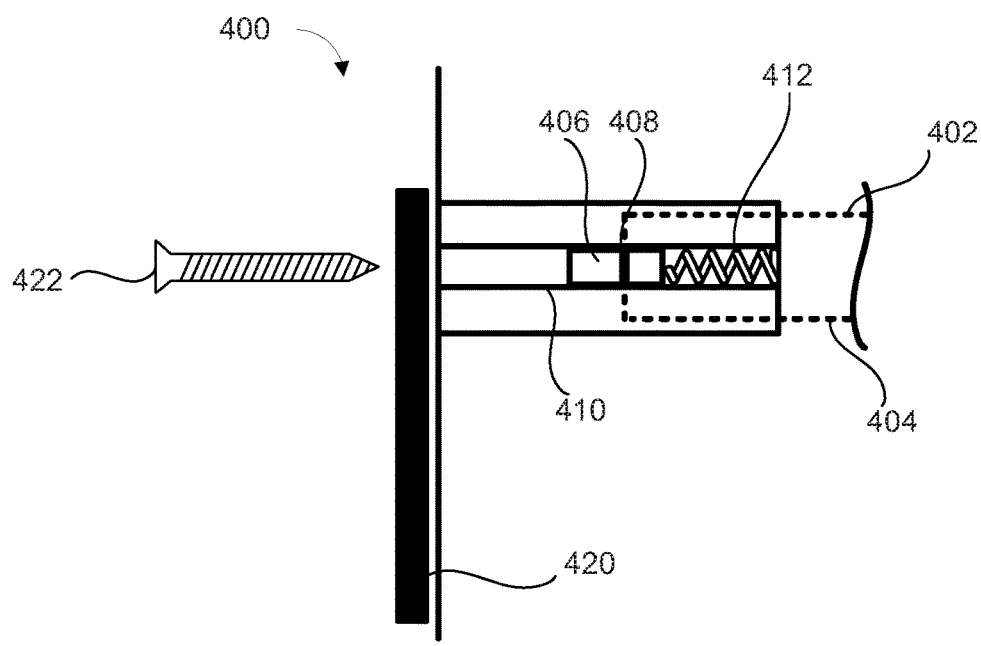

FIGS. 4A and 4B illustrate an example detection circuit 400 that may be similar or identical in some respects to FIGS. 3A and 3B. For instance, detection circuit 400 is shown having a pair of wires 402 and 404 that, when coupled together, complete the circuit (much like wires 302 and 304 of FIGS. 3A and 3B). Further, FIGS. 4A and 4B include an insulator 406 having a conductive segment 408. The insulator is configured to slide along an axis within channel 410 from the first position shown in FIG. 4A to the second position shown in FIG. 4B.

In FIG. 4A, screw 422 is configured to hold license plate 420 to the vehicle. When the screw is fully rotated into channel 410, it may contact insulator 406, causing insulator 406 to be in the first position, wherein the conductive segment is moved out of the coupling with wires 402 and 404, thus creating an "open" circuit. When screw 422 is rotated out of the channel, spring 412 may slide insulator 406 within channel 410 to the second position shown in FIG. 2. In this second position, the conductive segment 408 completes the coupling between wires 402 and 404, creating a completed or "closed" circuit.

FIGS. 4A and 4B illustrate that the insulator can move along an axis (i.e., within channel 410). And further, that the axis can be the same axis along which the screw 422 moves due to rotation (i.e., in and out of channel 410). In FIGS. 4A and 4B, the relationship of movement between the screw 422 and the insulator 406 may be 1:1. However other ratios are possible as well.

In some examples, the wires 302/304 and 402/404 may be coupled to a processor, such as processor 110. The processor may be configured to determine, based on a position of the insulator, that the screw has been removed. This may comprise determining by the processor that the detection circuit is open or closed, or has transitioned from one state to the other.

In some examples, the processor may make this determination while the vehicle is locked. A vehicle owner, dealership, or repair shop may wish to replace the license plate without causing the alarm to go off, or for the security measures to be activated. As such, the methods and/or functions disclosed herein may be available only while the vehicle is locked, as it may be assumed that the security measures are not needed while the vehicle is unlocked.

The processor and/or detection circuit may further be configured to determine when one or more of a plurality of screws used to hold up a license plate have been removed. For instance, a license plate may have two or four screw slots that are available to secure the license plate to the vehicle. In some examples, the detection circuit may be configured to determine when each screw individually has been removed. This can include having a set of wires and an insulator corresponding to each screw, with the set of wires coupled in parallel to the processor, such that the circuit is opened or closed when one of the screws is removed. Or the detection circuit may be configured to determine when all of the screws have been removed, in which case the sets of wires may be coupled in series, such that the circuit is only opened or closed when all screws are removed.

Responsive to determining that one or more screws have been removed, the processor may be configured to activate a camera directed toward the license plate. For instance, the processor may determine whether a screw corresponding to the front or rear license plate has been removed, and may activate a camera corresponding to the determined license plate. As such, where a screw of the front license plate is removed, the front camera may be activated to capture one or more images of the perpetrator. And similarly, where a screw corresponding to the rear license plate is removed, the processor may activate the rear facing camera.

In some examples, the processor may also be configured to transmit an alert to one or more remote devices, responsive to determining that one or more screws have been removed. The processor, in connection with one or more other vehicle components such as the communication module, may transmit an alert to the vehicle owner's mobile device, or another mobile device corresponding to the vehicle. The alert may include a warning that one or more screws has been removed from the license plate, or that a theft is in progress, for example. In addition or alternatively, a message may be sent to an authority figure such as the police, or a security company. The message may include information that can be used to prevent the theft or track own the perpetrator. IN some examples a message may first be sent to an owner or other person corresponding to the vehicle's mobile device, at which point the person may determine whether there is an active theft or not, and whether to send a message to the police. Adding in this step may prevent the police from being unnecessarily called when there is no theft in progress.

In some examples, the vehicle may include one or more sensors configured to determine whether a key FOB or phone as a key (PaaK) device is within a threshold range of the vehicle. If there is a key FOB present, the processor may determine that the owner is removing the screws, and may not carry out any safety measures such as turning on the alarm, taking pictures, or sending alerts or messages. But if there is no key FOB corresponding to the vehicle present within a threshold distance of the vehicle, the security measures described herein may be taken. The threshold distance may be as low as 10 feet or less, up to 100 feet or more, depending on the communication technology used.

In some examples, the processor may further be configured to provide an alert that one or more screws have been removed upon the vehicle starting up. The vehicle may include a display, which may display the alert to the driver or passenger when the vehicle is turned on.

The detection circuits described herein may further include one or more logic gates configured to determine whether one or more of the plurality of screws have been removed. As such, the detection circuit may be able to determine when a single screw is removed, when two or more screws have been removed, and/or when all screws have been removed.

Figure 5:
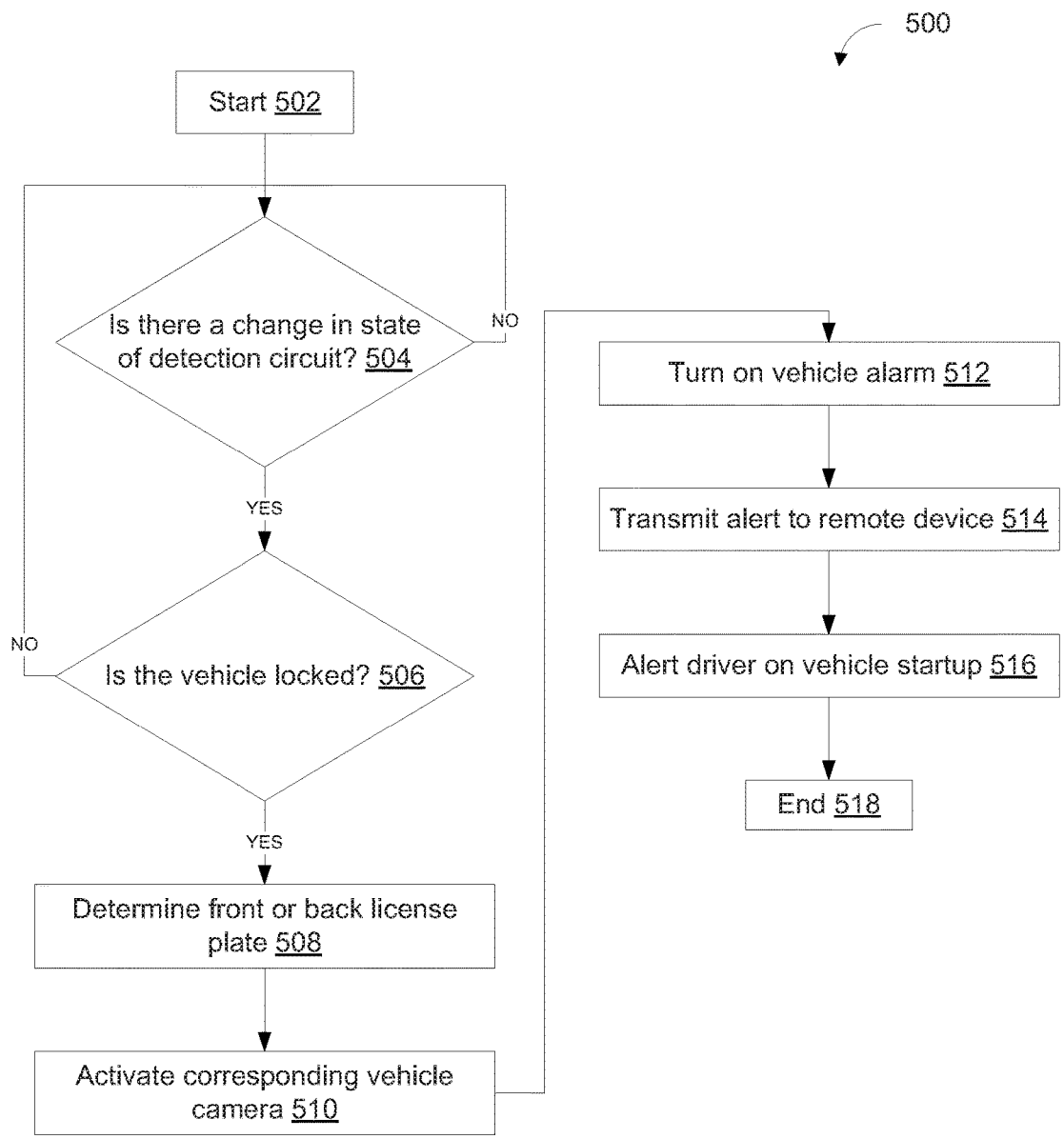
FIG. 5 illustrates a flowchart of an example method according to embodiments of the present disclosure.

FIG. 5 illustrates a flowchart of an example method 500 according to embodiments of the present disclosure. Method 500 may enable the detection and mitigation of vehicle license plate theft by determining when one or more screws have been removed from the license plate. The flowchart of FIG. 5 is representative of machine readable instructions that are stored in memory (such as memory 212) and may include one or more programs which, when executed by a processor (such as processor 110) may cause vehicle 100 and/or one or more systems or devices to carry out one or more functions described herein. While the example program is described with reference to the flowchart illustrated in FIG. 5, many other methods for carrying out the functions described herein may alternatively be used. For example, the order of execution of the blocks may be rearranged or performed in series or parallel with each other, blocks may be changed, eliminated, and/or combined to perform method 500. Further, because method 500 is disclosed in connection with the components of FIGS. 1-4, some functions of those components will not be described in detail below.

Method 500 may start at block 520. At block 504, method 500 may include determining whether there is a change in state of the detection circuit (i.e., is the circuit open or closed). As described above, various embodiments may be configured such that a closed circuit corresponds to a missing screw, while an open circuit corresponds to a properly attached screw. But the alternative may be true. As such, block 504 may include determining when there is a change in state from closed to open circuit, or vice versa.

If there is a change in the state of the detection circuit, method 500 may include determining whether the vehicle is locked at block 506. IF the vehicle is unlocked, the method may return to block 504. But if the vehicle is locked, method 500 may proceed to block 508.

At block 508, method 500 may include determining whether the change in the state of the detection circuit corresponds to the front or the rear license plate. At block 510, method 500 may then include activating a corresponding vehicle camera. For instance, where the rear detection circuit has changed state, the rear camera may be activated.

At block 512, method 500 may include turning on the vehicle alarm. This may startle the perpetrator that is removing the screw(s), which may cause him or her to run away and prevent the theft.

At block 514, method 500 may include transmitting an alert to a remote device. This may include transmitting a message to a mobile device corresponding to the vehicle, the police, a centralized server, or another interested party. Further, method 500 may include alerting the vehicle driver or passengers upon startup of the vehicle at block 516. Method 500 may then end at block 518.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
a detection circuit having an insulator configured to slide along an axis based on a rotation of a screw holding a license plate; and
a processor configured to:
determine, based on a position of the insulator, that the screw has been removed while the vehicle is locked; and
responsively activate a camera directed toward the license plate.

2. The vehicle of claim 1, further comprising a spring coupled to the insulator, configured to bias the insulator toward a default position along the axis.

3. The vehicle of claim 1, wherein the insulator is in a first position when the screw is fully rotated, and a second position when the screw is removed.

4. The vehicle of claim 3, wherein the detection circuit is configured to be an open circuit when the insulator is in the first position, and a closed circuit when the insulator is in the second position.

5. The vehicle of claim 3, wherein a rotation of the screw causes the screw to move along the axis such that movement of the screw along the axis corresponds to a movement of the insulator along the axis.

6. The vehicle of claim 5, wherein the axis is a first axis, and wherein rotation of the screw causes the screw to move along a second axis perpendicular to the first axis.

7. The vehicle of claim 1, wherein determining that the screw has been removed comprises determining that the detection circuit is closed.

8. The vehicle of claim 1, wherein:
the detection circuit comprises a front detection circuit having a front screw, the license plate comprises a front license plate, and the camera comprises a front facing camera,
the vehicle further comprises a rear detection circuit having a rear screw, a rear license plate, and a rear facing camera, and
the processor is further configured to:
responsive to determining that the front screw has been removed, activate the front facing camera; and
responsive to determining that the rear screw has been removed, activate the rear facing camera.

9. The vehicle of claim 1, wherein the processor is further configured to transmit an alert to a mobile device corresponding to the vehicle.

10. The vehicle of claim 1, wherein the processor is further configured to:
determine that a key FOB corresponding to the vehicle is not present within a threshold distance of the vehicle; and
responsive to determining that the screw has been removed, and that the key FOB is not present, activate the camera.

11. The vehicle of claim 1, wherein the processor is further configured to provide an alert to a vehicle driver when the vehicle is started.

12. The vehicle of claim 1, wherein the screw is a first screw of a plurality of screws for holding the license plate, wherein the detection circuit further comprises one or more logic gates configured to determine whether one or more of the plurality of screws have been removed.

13. A method comprising:
monitoring a detection circuit of a vehicle having an insulator configured to slide along an axis based on a rotation of a screw holding a license plate;
determining, by a vehicle processor based on a position of the insulator, that the screw has been removed while the vehicle is locked; and
responsively activating a camera directed toward the license plate.

14. The method of claim 13, wherein the insulator is in a first position when the screw is fully rotated, and a second position when the screw is removed.

15. The method of claim 14, wherein the detection circuit is configured to be an open circuit when the insulator is in the first position, and a closed circuit when the insulator is in the second position.

16. The method of claim 13, wherein determining that the screw has been removed comprises determining that the detection circuit is closed.

17. The method of claim 13, wherein:
the detection circuit comprises a front detection circuit having a front insulator configured to slide along a front axis based on rotation of a front screw, the license plate comprises a front license plate, and the camera comprises a front facing camera,
the method further comprises
monitoring a rear detection circuit having a rear insulator configured to slide along a rear axis based on a rotation of a rear screw holding a rear license plate;
responsive to determining that the front screw has been removed, activating the front facing camera; and
responsive to determining that the rear screw has been removed, activating a rear facing camera.

18. The method of claim 13, further comprising:
determining that a key FOB corresponding to the vehicle is not present within a threshold distance of the vehicle; and
responsive to determining that the screw has been removed, and that the key FOB is not present, activating the camera.

19. The method of claim 13, further comprising providing an alert to a vehicle driver when the vehicle is started.

20. The method of claim 13, wherein the screw is a first screw of a plurality of screws for holding the license plate, wherein the detection circuit further comprises one or more logic gates configured to determine whether one or more of the plurality of screws have been removed.

* * * * *